(12) United States Patent
Chuang et al.

(10) Patent No.: US 7,842,380 B2
(45) Date of Patent: Nov. 30, 2010

(54) BRIGHTNESS ENHANCEMENT FILM

(75) Inventors: Shih-Yi Chuang, Kaohsiung (TW); Chao-Yi Tsai, Kaohsiung County (TW); Guo-Long Wu, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 421 days.

(21) Appl. No.: 11/411,127

(22) Filed: Apr. 26, 2006

(65) Prior Publication Data

US 2007/0254146 A1 Nov. 1, 2007

(51) Int. Cl.
*B32B 5/16* (2006.01)
*B32B 27/38* (2006.01)
*B32B 27/40* (2006.01)
*B32B 17/06* (2006.01)
*B32B 27/06* (2006.01)
*B32B 27/00* (2006.01)

(52) U.S. Cl. .................. 428/323; 428/328; 428/330; 428/331; 428/413; 428/415; 428/423.1; 428/426; 428/474.4; 428/500

(58) Field of Classification Search .................. None
See application file for complete search history.

(56) References Cited

U.S. PATENT DOCUMENTS

| 6,950,236 | B2 * | 9/2005 | Hokazono et al. | 359/586 |
|---|---|---|---|---|
| 7,074,463 | B2 * | 7/2006 | Jones et al. | 428/1.1 |
| 2003/0153643 | A1 * | 8/2003 | Jin et al. | 522/81 |
| 2006/0082699 | A1 * | 4/2006 | Gehlsen et al. | 349/61 |

FOREIGN PATENT DOCUMENTS

| WO | WO-96/23649 | 8/1996 |
|---|---|---|
| WO | WO02/084338 | * 10/2002 |

* cited by examiner

Primary Examiner—Sheeba Ahmed
(74) Attorney, Agent, or Firm—Bacon & Thomas, PLLC

(57) ABSTRACT

A brightness enhancement film comprising a substrate which comprises, on one side, a scratch-resistant layer comprising inorganic microparticles is provided. The brightness enhancement film is useful as a scratch-resistant brightness enhancement film in liquid crystal displays.

17 Claims, 3 Drawing Sheets

BRIGHTNESS ENHANCEMENT FILM

FIELD OF THE INVENTION

The invention relates to a brightness enhancement film, in particular, a scratch-resistant brightness enhancement film for use in liquid crystal displays.

BACKGROUND OF THE INVENTION

Generally, the main structure of liquid crystal displays (LCDs) comprises a front panel and a back-light module wherein the front panel comprises, for example, indium tin oxide (ITO) conductive glass, liquid crystal compounds, alignment films, color filters, polarizing films, driving ICs etc. and the back-light module comprises, for example, lamps, light guides, various optical films etc. For achieving better viewing angle and color performance in LCDs, many attempts have been made in this field, for example, the brightness of LCDs can be increased by increasing the number of the lamps. However, this makes excess heat stored in the liquid crystal displays and adversely affects the life and quality of the other elements. Also, this increases the power consumption and therefore the requirement of off-line use of an information product with the aid of a battery cannot be satisfied. Currently, increasing the panel brightness by maximizing the efficiency of the light source through the use of various optical films in back-light module, without the need of modifying any other element or design or the need of extra energy consumption, has become the most effective and simplest solution.

Brightness enhancement films are also called prism films in this industry, which have the structure of microprisms formed by curing a specific acrylic resin with high energy UV light on a polyester optical film in a thickness of 50-200 μm. The major function of brightness enhancement films is to collect the lights scattered by light guides through refraction and total internal reflection and converge the collected lights in a direction within on-axis ±35° so as to increase the brightness of LCDs.

Currently, there are many patents and literatures published and dealt with how brightness enhancement films are used in back-light modules, for example, WO 96/23649 in the name of 3M company discloses a method for preventing groove tip deformation in a brightness enhancement film comprising heating prism films to a temperature higher than or equal to the glass transition temperature of the polymer so as to increase the hardness of the groove tips. However, as shown in FIG. 1 of the present invention, the brightness enhancement film has brightness-enhancing structure on only one surface with the lower surface being smooth, that is, no scratch-resistant treatment is carried out, and thus the lower surface is easily damaged during processing and accordingly, the optical performance of the brightness enhancement film is adversely affected.

For overcoming the disadvantages mentioned above, the invention provides a brightness enhancement film as detailedly described below. As shown in FIG. 2 of the present invention, the lower surface of the brightness enhancement film according to WO 96/23649 is further coated with a coating composition comprising inorganic microparticles and then cured. The coating layer comprising inorganic microparticles not only can increase the hardness of the lower surface of the brightness enhancement film but also can prevent the surface from being scratched during processing. As a result, a better optical performance is obtained.

SUMMARY OF THE INVENTION

The invention provides a brightness enhancement film comprising a substrate which comprises, on one side, at least one brightness-gathering layer, the brightness enhancement film being characterized in that the substrate comprises, on the other side, at least one scratch-resistant layer comprising a resin and inorganic microparticles.

DETAILED DESCRIPTION OF THE PREFERRED EMBODIMENTS

Figure 1:
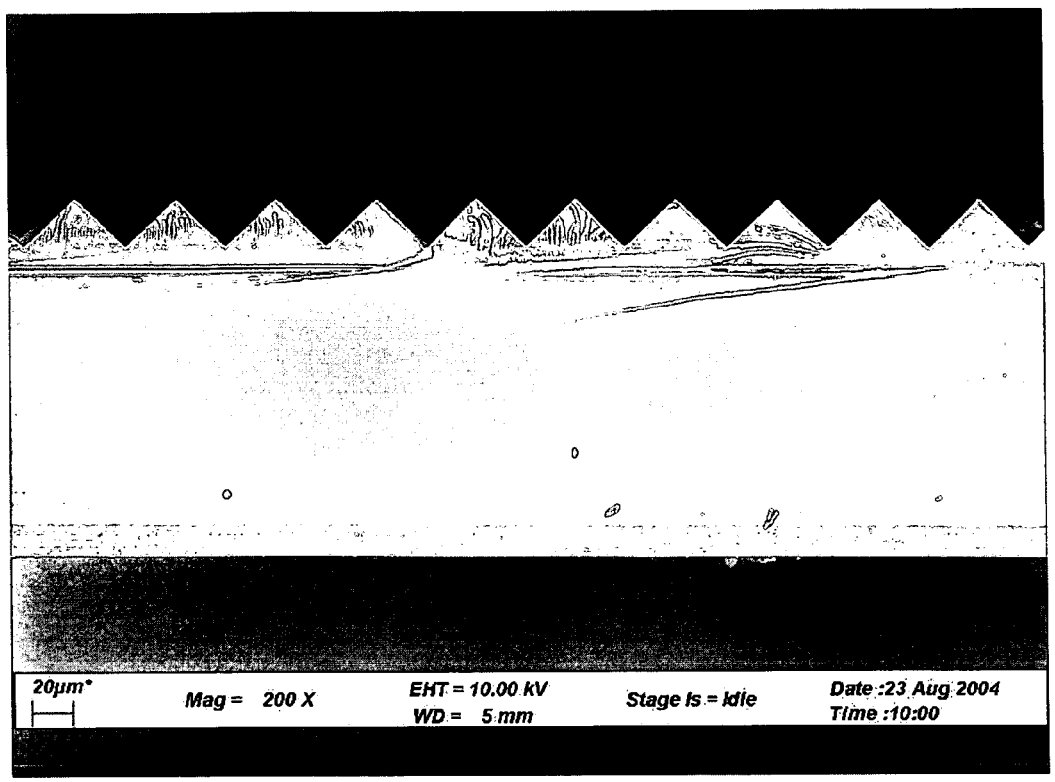
FIG. 1 is a schematic view of the brightness enhancement film disclosed in WO 96/23649.
Figure 2:
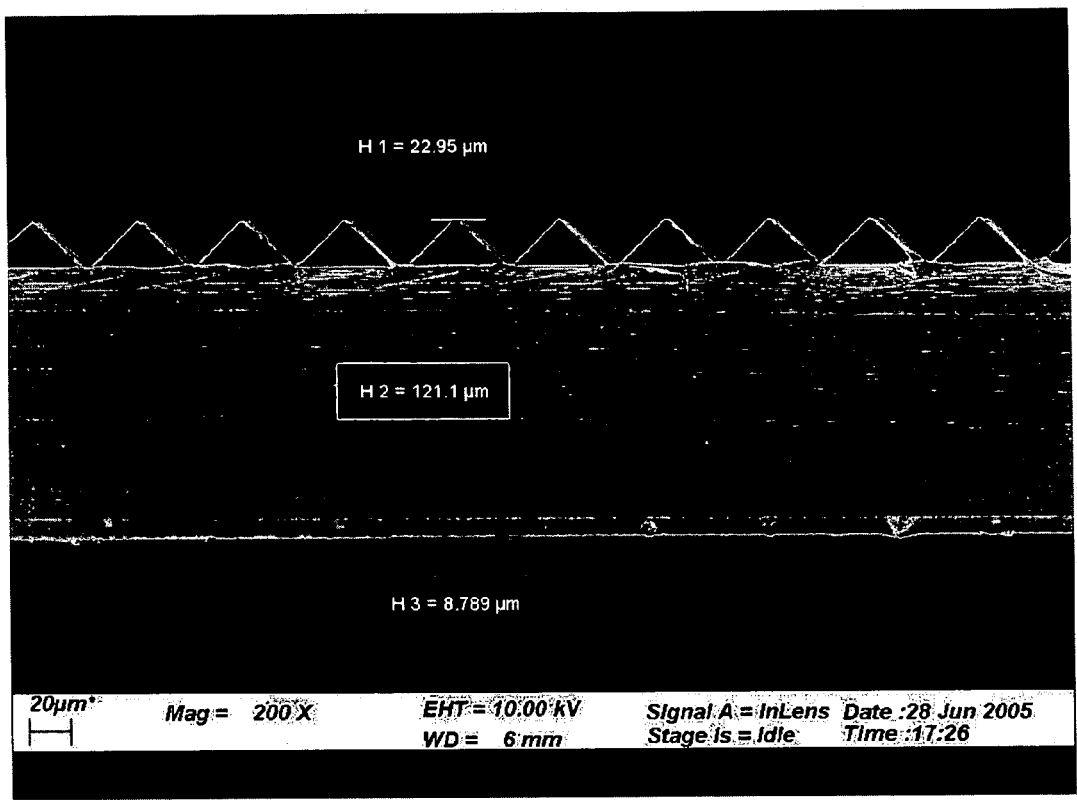
FIG. 2 is a side view of one example of the invention.
Figure 3:
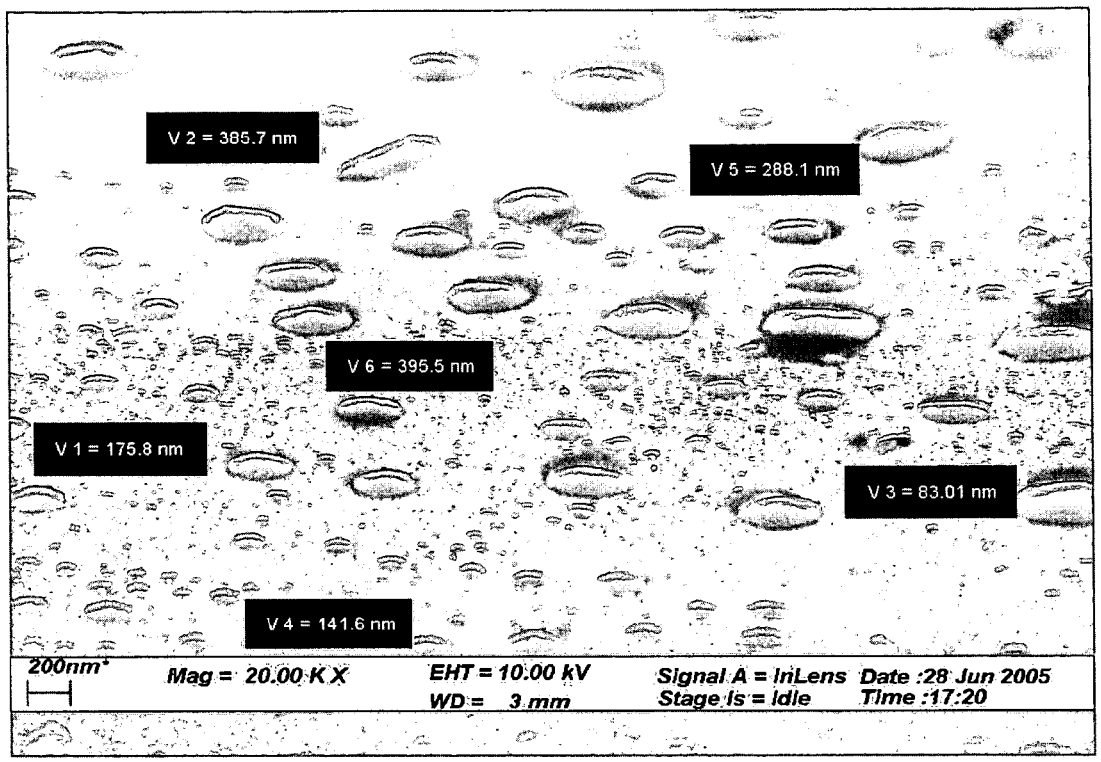
FIG. 3 is an enlarged view of a part of FIG. 2 of the invention.

The substrate suitable for use in the brightness enhancement film of the invention can be any one known to people ordinarily skilled in this art, for example, glass or plastic. There is not particular limitation for the plastic mentioned above, examples of the plastic include, but not limited to, polyester resins, for example, polyethyleneterphthalate (PET); polyacrylate resins, for example, poly(methyl methacrylate) (PMMA); polyolefin resins, for example, polyethylene (PE) or polypropylene (PP); polyimide resins; polycarbonate resins; polyurethane resins; triacetyl cellulose (TAC); or mixtures thereof. Preferred plastic substrate includes polyethyleneterphthalate, poly(methyl methacrylate), triacetyl cellulose and mixtures thereof. The thickness of the substrate usually depends on the desired requirements of the optical products and is preferred in the range of from about 50 μm to about 150 μm.

The brightness enhancement film according to the invention has the properties of enhancing brightness and scratch resistance. For achieving the scratch resistance, at least one scratch-resistant layer is provided to the lower surface of the substrate. The scratch-resistant layer is formed by coating the substrate with a coating composition comprising inorganic microparticles and a resin. The scratch-resistant layer has a non-smooth structure and a hardness of no less than 130 sec measured according to standard DIN 53157.

The scratch-resistant layer of the invention comprises inorganic microparticles in various particle sizes. The inorganic microparticles may have a particle size in a nanometer order (nanoscale), preferably, in the range of from about 1 to about 500 nm. The inorganic microparticles suitable for use in the invention has no particular limitation in their species, the examples includes, but not limited to, titanium oxide ($TiO_2$), silicon oxide ($SiO_2$), zinc oxide (ZnO), barium sulfate ($BaSO_4$), calcium carbonate ($CaCO_3$), zirconium oxide ($ZrO_2$) or mixtures thereof. Preferably, the inorganic microparticles is silicon oxide.

The resin used in the brightness enhancement film according to the invention can be obtained from the polymeric monomer suitable in the production of brightness enhancement film known by people ordinarily skilled in this art. Suitable polymeric monomer includes, for example, epoxy diacrylate, halogenated epoxy diacrylate, methyl methacrylate, isobornyl acrylate, 2-phenoxy ethyl acrylate, acrylamide, styrene, halogenated styrene, acrylic acid, acrylonitrile, methacrylonitrile, biphenylepoxyethyl acrylate, halogenated biphenylepoxyethyl acrylate, alkoxylated epoxy diacrylate, halogenated alkoxylated epoxy diacrylate, aliphatic urethane diacrylate, aliphatic urethane hexaacrylate, aromatic urethane hexaacrylate, bisphenol-A epoxy diacrylate, novolac epoxy acrylate, polyester acrylate, polyester diacrylate, acrylate-capped urethane oligomer, or mixtures thereof. Preferred polymeric monomer is halogenated epoxy diacrylate, methyl methacrylate, 2-phenoxy ethyl acrylate, aliphatic urethane diacrylate, aliphatic urethane hexaacrylate, and aromatic urethane hexaacrylate.

In the brightness enhancement film according to the invention, the ratio between the resin and the nanoscale inorganic microparticles is not critical and can be determined depending on the object desired. The combining ratio can vary in a wide range, for example, the content of the inorganic microparticles may be, based on the total weight of the resins, 0.01 to 50%, 0.1 to 35%, 0.5 to 25%, or 0.5 to 10%.

Additives well known to people ordinarily skilled in this art can be added to the scratch-resistant layer of the brightness enhancement film according to the invention, for example, leveling agent, defoamer, antistatic agent etc.

The scratch-resistant layer of the brightness enhancement film according to the invention can be prepared by any method well known to people ordinarily skilled in this art, for example, the layer can be prepared by the method comprising the steps of:

(a) admixing a resin, a photoinitiator and nanoscale microparticles to form a colloidal coating composition;

(b) applying the colloidal coating composition onto the lower surface of a substrate to form a layer;

(c) curing the layer with irradiation of an energy radiation or heat or both.

The photoinitiator used in step (a) refers to a substance that generates free radicals upon light irradiation and therefore initiates polymerization reaction through the propagation of the free radicals. The photoinitiator suitable for the invention has no particular limitation, the examples include, but not limited to, benzophenone, benzoin and benzyl, and is preferably benzophenone.

In step (c) mentioned above, that is, the curing step, curing is carried out through photopolymerization irradiated with an energy radiation. The energy radiation refers to a light source with a wavelength in a specific range, for example, it can be ultraviolet rays, infrared rays, visible lights or actinic rays (radiation or irradiation) etc. Ultraviolet rays are preferred. The irradiation intensity can be from 1 to 300 $mJ/cm^2$, and preferably 10 to 100 $mJ/cm^2$.

If necessary, the steps mentioned above can be repeated so as to obtain a plurality of scratch-resistant layers.

For enhancing light intensity, according to the invention the upper surface of the substrate, that is, the opposite side to the scratch-resistant layer, comprises at least one brightness-gathering layer in a thickness of from 5 µm to 100 µm, and preferably, 10 µm to 40 µm, and with a refractive index of at least 1.55. The brightness-gathering layer is formed by coating the substrate with a composition comprising a resin, a photoinitiator and a cross-linking agent. Suitable resins are well known to people ordinarily skilled in this art and can be exemplified as, but not limited to, polyester resins, polyacrylate resins or polycarbonate resins etc. The photoinitiator suitable for use in the invention has no particular limitation, it can be any one that generates free radicals upon irradiation with lights and initiates polymerization reaction through the propagation of the free radicals. Examples that can be mentioned include, for example, benzophenone. Suitable cross-linking agents include, for example, (meth)acrylates having one or more functional groups, with those having multiple functional groups being preferred, such that the glass transition temperature can be increased.

The br brightness-gathering layer according to the invention can be in the form of a flat film or in the form having microstructure, wherein the microstructure includes, but not limited to, a regular or irregular prismatic pattern, an annular prismatic pattern, a cube-corner pattern, a bead-like pattern and a lens-like pattern. The brightness-gathering layer preferably has a regular prismatic pattern which is excellent in the performance of light focusing and therefore increase the brightness of displays.

The substrate according to the invention is coated on the lower surface with a coating composition comprising inorganic microparticles and thus the hardness of the lower surface is effectively increased to avoid surface scratching and to prevent the optical properties from being damaged. Further, the brightness enhancement film according to the invention has a structure for enhancing brightness and therefore is useful for enhancing the brightness of the back light in the liquid crystal displays and finally enhances the brightness of the liquid crystal display panels.

The invention is further described by the examples illustrated below. However, they are not constructed to limit the invention in any sense. Any modifications and variations made by people ordinarily skilled in this art are within the scope of the specification and the claims appended.

EXAMPLES

Optical films according to the invention were prepared by the methods described below, with the composition of resins and photoinitiators indicated in Table 1.

TABLE 1

| component | EM210 ® (g) | 624-100 ® (g) | Chivacure ® BP (g) |
|---|---|---|---|
| A | 40 | 60 | 3 |

EM210 ® (2-phenoxy ethyl acrylate, sold by Eternal Co.) and 624-100 ® (epoxy acrylate, sold by Eternal Co.) in a weight ratio of 40% and 60%, respectively, were mixed together and then benzophenone (Chivacure ® BP, provided by Double Bond Chemicals), as a photoinitiator, was added to form a colloidal coating composition after stirring.

Into four aliquots of the colloidal coating composition prepared above, 1%, 3%, 5% and 7%, in terms of the weight of the colloidal coating composition, of $SiO_2$ (601A-35®, sold by Eternal Co.) were added respectively. The resulting compositions were applied onto substrates of polyethyleneterphthalate (PET) (U34®, sold by TORAY Co.), dried and cured with an energy ray to obtain an optical film in a thickness of 9 µm.

The resulting films were subjected to a hardness test and the result was shown in Table 2.

Hardness test: hardness was determined according to standard DIN 53157 with a pendulum instrument (BYK Co., König pendulum).

TABLE 2

| Example | Solid content of the nanoscale microparticles (%) | Hardness (sec) |
|---|---|---|
| 1 | 0 | 130 |
| 2 | 1 | 138 |
| 3 | 3 | 143 |
| 4 | 5 | 147 |
| 5 | 7 | 148 |

From the result shown in Table 2, it is known that the hardness of the brightness enhancement film can be increased after being coated with a coating composition comprising inorganic particles. As a result, the brightness enhancement film according to the invention is excellent in the properties of brightness enhancement and scratch resistance such that the scratches of the surface of the brightness enhancement film are reduced and accordingly, the effect of preventing the optical properties from being damaged is achieved.

What is claimed is:

1. A brightness enhancement film comprising a substrate which comprises, on one side, at least one brightness-gathering layer having a microstructure, the brightness enhancement film being characterized in that the substrate comprises, on the other side, at least one scratch-resistant layer being provided to the lower surface of the substrate, wherein the scratch-resistant layer has a non-smooth structure and comprises a resin and inorganic microparticles having a particle size of from 1 to 500 nm, wherein the content of the inorganic microparticles is from 0.01 to 7%, based on the total weight of the resins.

2. The brightness enhancement film according to claim 1, wherein the inorganic microparticles are selected from the group consisting of zinc oxide (ZnO), silicon oxide ($SiO_2$), titanium oxide ($TiO_2$), zirconium oxide ($ZrO_2$), barium sulfate ($BaSO_4$), calcium carbonate ($CaCO_3$) and mixtures thereof.

3. The brightness enhancement film according to claim 2, wherein the inorganic microparticles are silicon oxide.

4. The brightness enhancement film according to claim 1, wherein the resin is polymerized from a polymeric monomer selected from the group consisting of epoxy diacrylate, halogenated epoxy diacrylate, methyl methacrylate, isobornyl acrylate, 2-phenoxy ethyl acrylate, acrylamide, styrene, halogenated styrene, acrylic acid, acrylonitrile, methacrylonitrile, biphenylepoxyethyl acrylate, halogenated biphenylepoxyethyl acrylate, alkoxylated epoxy diacrylate, halogenated alkoxylated epoxy diacrylate, aliphatic urethane diacrylate, aliphatic urethane hexaacrylate, aromatic urethane hexaacrylate, bisphenol-A epoxy diacrylate, novolac epoxy acrylate, polyester acrylate, polyester diacrylate, acrylate-capped urethane oligomer, or mixtures thereof.

5. The brightness enhancement film according to claim 1, wherein the substrate is plastic or glass.

6. The brightness enhancement film according to claim 1, wherein the microstructure is selected from the group consisting of a regular or irregular prismatic pattern, an annular prismatic pattern, a cube-corner pattern, a bead-like pattern and a lens-like pattern.

7. The brightness enhancement film according to claim 6, wherein the microstructure has a regular prismatic pattern.

8. The brightness enhancement film according to claim 2, wherein the resin is polymerized from a polymeric monomer selected from the group consisting of epoxy diacrylate, halogenated epoxy diacrylate, methyl methacrylate, isobornyl acrylate, 2-phenoxy ethyl acrylate, acrylamide, styrene, halogenated styrene, acrylic acid, acrylonitrile, methacrylonitrile, biphenylepoxyethyl acrylate, halogenated biphenylepoxyethyl acrylate, alkoxylated epoxy diacrylate, halogenated alkoxylated epoxy diacrylate, aliphatic urethane diacrylate, aliphatic urethane hexaacrylate, aromatic urethane hexaacrylate, bisphenol-A epoxy diacrylate, novolac epoxy acrylate, polyester acrylate, polyester diacrylate, acrylate-capped urethane oligomer, or mixtures thereof.

9. The brightness enhancement film according to claim 8, wherein the substrate is plastic or glass.

10. The brightness enhancement film according to claim 9, wherein the microstructure is selected from the group consisting of a regular or irregular prismatic pattern, an annular prismatic pattern, a cube-corner pattern, a bead-like pattern and a lens-like pattern.

11. The brightness enhancement film according to claim 10, wherein the microstructure has a regular prismatic pattern.

12. A brightness enhancement film according to claim 1 wherein the content of the inorganic microparticles is from 1 to 7%, based on the total weight of the resins.

13. A brightness enhancement film according to claim 2 wherein the content of the inorganic microparticles is from 1 to 7%, based on the total weight of the resins.

14. A brightness enhancement film according to claim 3 wherein the content of the inorganic microparticles is from 1 to 7%, based on the total weight of the resins.

15. A brightness enhancement film according to claim 4 wherein the content of the inorganic microparticles is from 1 to 7%, based on the total weight of the resins.

16. The brightness enhancement film according to claim 14 wherein the substrate is plastic or glass.

17. The brightness enhancement film according to claim 14 wherein the substrate is a resin which is polymerized from a polymeric monomer selected from the group consisting of epoxy diacrylate, halogenated epoxy diacrylate, methyl methacrylate, isobornyl acrylate, 2-phenoxy ethyl acrylate, acrylamide, styrene, halogenated styrene, acrylic acid, acrylonitrile, methacrylonitrile, biphenylepoxyethyl acrylate, halogenated biphenylepoxyethyl acrylate, alkoxylated epoxy diacrylate, halogenated alkoxylated epoxy diacrylate, aliphatic urethane diacrylate, aliphatic urethane hexaacrylate, aromatic urethane hexaacrylate, bisphenol-A epoxy diacrylate, novolac epoxy acrylate, polyester acrylate, polyester diacrylate, acrylate-capped urethane oligomer, or mixtures thereof.

\* \* \* \* \*